US012428277B2

(12) United States Patent
Neubauer et al.

(10) Patent No.: US 12,428,277 B2
(45) Date of Patent: Sep. 30, 2025

(54) SCISSOR LIFT WITH MIDDLE PIN OFFSET AND KICKER

(71) Applicant: Oshkosh Corporation, Oshkosh, WI (US)

(72) Inventors: Mark G. Neubauer, Oshkosh, WI (US); Benjamin C. Bruno, Oshkosh, WI (US); Devin J. Rosencrance, Oshkosh, WI (US); Patrick Dingman, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 18/590,619

(22) Filed: Feb. 28, 2024

(65) Prior Publication Data

US 2024/0199399 A1 Jun. 20, 2024

Related U.S. Application Data

(63) Continuation of application No. 17/967,294, filed on Oct. 17, 2022, now Pat. No. 11,945,702.

(51) Int. Cl.
*B66F 11/04* (2006.01)

(52) U.S. Cl.
CPC .................................. *B66F 11/042* (2013.01)

(58) Field of Classification Search
CPC ............................. B66F 11/042; B66F 7/0666
See application file for complete search history.

(56) References Cited

U.S. PATENT DOCUMENTS 3,373,844 A * 3/1968 Schafer ..................... E04G 1/22 182/69.5
4,114,854 A * 9/1978 Clark .................... B66F 11/042 187/269
4,373,701 A * 2/1983 Kishi .................... B66F 11/042 254/9 C
9,670,039 B1 * 6/2017 Enochs ................... B66F 7/065
(Continued)

FOREIGN PATENT DOCUMENTS

| | | |
|---|---|---|
| CN | 110329964 A | 10/2019 |
| EP | 0 372 246 A1 | 6/1990 |
| FR | 2673926 A1 | 9/1992 |

OTHER PUBLICATIONS

Invitation to Pay Additional Fees issued in connection with PCT Appl. No. PCT/US2023/035218 dated Feb. 20, 2024.

*Primary Examiner* — Michael A Riegelman
(74) *Attorney, Agent, or Firm* — FOLEY & LARDNER LLP

(57) ABSTRACT

A lift device includes a base, a platform, and a scissor assembly coupling the base to the platform. The scissor assembly includes a first scissor layer, a second scissor layer, and a third scissor layer each including an inner arm pivotally coupled to an outer arm. The first scissor layer has a first middle axis offset vertically from a first end axis center point. A kicker assembly couples an actuator configured to raise and lower the platform to the second scissor layer and the third scissor layer. The kicker assembly includes a kicker with opposing first and second kicker ends. The kicker is pivotally coupled to the second scissor layer and releasably coupled to the third scissor layer. The actuator rotates the kicker relative to the second scissor layer. A guide is coupled to the kicker and configured to limit the rotation of the kicker.

16 Claims, 12 Drawing Sheets

(56) References Cited

U.S. PATENT DOCUMENTS

| | | | | |
|---|---|---|---|---|
| 11,679,966 | B2 * | 6/2023 | Rosencrance | B66F 11/042 187/211 |
| 11,691,858 | B2 * | 7/2023 | Neubauer | B66F 7/0666 182/69.5 |
| 11,945,702 | B1 * | 4/2024 | Neubauer | B66F 11/042 |
| 2008/0224107 | A1 * | 9/2008 | Polins | E06B 5/01 254/45 |
| 2020/0290852 | A1 * | 9/2020 | Rosencrance | B66F 11/042 |
| 2020/0290853 | A1 * | 9/2020 | Neubauer | E04G 1/22 |
| 2020/0290855 | A1 * | 9/2020 | Bruno | B66F 7/0666 |
| 2020/0317256 | A1 * | 10/2020 | Hao | B62D 7/18 |
| 2020/0317492 | A1 * | 10/2020 | Bhatia | B66F 13/00 |
| 2022/0402735 | A1 * | 12/2022 | Kritzer | B66F 9/065 |
| 2023/0271815 | A1 * | 8/2023 | Rosencrance | B66F 7/28 187/269 |
| 2023/0286570 | A1 * | 9/2023 | Hao | B66F 11/042 |
| 2023/0286571 | A1 * | 9/2023 | Hao | B66F 9/07568 |
| 2023/0286786 | A1 * | 9/2023 | Xu | B66F 7/28 |
| 2024/0124285 | A1 * | 4/2024 | Neubauer | B66F 7/0666 |
| 2024/0199399 | A1 * | 6/2024 | Neubauer | B66F 7/0666 |
| 2024/0367955 | A1 * | 11/2024 | Rosencrance | B66F 7/0633 |

* cited by examiner

SCISSOR LIFT WITH MIDDLE PIN OFFSET AND KICKER

CROSS-REFERENCE TO RELATED APPLICATIONS

This application is a continuation of U.S. patent application Ser. No. 17/967,294, filed Oct. 17, 2022, which is incorporated by reference herein in its entirety.

BACKGROUND

Certain aerial work platforms, known as scissor lifts, include a frame assembly that supports a platform. The platform is coupled to the frame assembly using a system of linked supports arranged in a crossed pattern, forming a scissor assembly. As the supports rotate relative to one another, the scissor assembly extends or retracts, raising or lowering the platform relative to the frame. Accordingly, the platform moves primarily or entirely vertically relative to the frame assembly. Scissor lifts are commonly used where scaffolding or a ladder might be used, as they provide a relatively large platform from which to work that can be quickly and easily adjusted to a broad range of heights. Scissor lifts are commonly used for painting, construction projects, accessing high shelves, changing lights, and maintaining equipment located above the ground.

SUMMARY

One embodiment relates to a lift device including a base, a platform, and a scissor assembly coupling the base to the platform. The scissor assembly includes a first scissor layer including a first inner arm pivotally coupled to a first outer arm, wherein the first inner arm is configured to rotate relative to the first outer arm about a first middle axis. The first scissor layer has a first end axis center point positioned at an intersection of (a) a first straight line that extends from an upper end of the first inner arm to a lower end of the first inner arm and (b) a second straight line that extends from an upper end of the first outer arm to a lower end of the first outer arm. The scissor assembly includes a second scissor layer coupled to the first scissor layer, the second scissor layer including a second inner arm pivotally coupled to a second outer arm, a third scissor layer coupled to the second scissor layer, the third scissor layer including a third inner arm pivotally coupled to a third outer arm, an actuator configured to move the platform between a fully raised position and a fully lowered position relative to the base, and a kicker assembly coupling the actuator to the second scissor layer and the third scissor layer. The kicker assembly includes a kicker having opposing first and second kicker ends. The kicker is pivotally coupled to the second scissor layer proximate the first kicker end and releasably coupled to the third scissor layer proximate the second kicker end. The kicker is operably coupled to the actuator between the first and second kicker ends such that the actuator is configured to rotate the kicker relative to the second scissor layer. The kicker assembly also includes a guide coupled to the kicker and configured to limit the rotation of the kicker. The first middle axis of the first scissor layer is offset vertically from the first end axis center point.

Another embodiment relates to a scissor lift assembly including a plurality of scissor layers and an actuator configured to extend and retract the scissor layers. Each scissor layer includes an inner arm having an upper end configured to rotate about a first end axis and a lower end configured to rotate about a second end axis, and an outer arm having an upper end configured to rotate about a third end axis and a lower end configured to rotate about a fourth end axis. The inner arm is pivotally coupled to the outer arm such that the outer arm and the inner arm rotate relative to one another about a middle axis. The scissor lift assembly also includes a kicker assembly coupling the actuator to a first scissor layer of the plurality of scissor layers and a second scissor layer of the plurality of scissor layers. The kicker assembly includes a kicker pivotally coupled to the first scissor layer and rotatable around a kicker axis relative to the first scissor layer and the second scissor layer, a stop supported by the first scissor layer and configured to selectively restrain the rotation of the kicker around the kicker axis to an arc of a circle centered at the kicker axis, and an engagement surface supported by the second scissor layer and configured to selectively engage with the kicker. The kicker is operably coupled to the actuator such that the actuator is configured to rotate the kicker around the kicker axis.

Still another embodiment relates to method of operating a lift device, including the steps of raising a first scissor layer including a first inner arm pivotally coupled to a first outer arm a first distance by rotating a kicker including opposing first and second kicker ends around a kicker axis a first arc length to engage the second end of the kicker with the first scissor layer and raise the first scissor layer a first distance, disengaging the second kicker end from the first scissor layer, and raising the first scissor layer a second distance by engaging the kicker with a second scissor layer including a second inner arm pivotally coupled to a second outer arm a second distance, wherein the first inner arm is pivotally coupled to the second inner arm and the first outer arm is pivotally coupled to the second arm such that the first scissor layer is pivotally coupled to the second scissor layer raising the first scissor layer the second distance.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
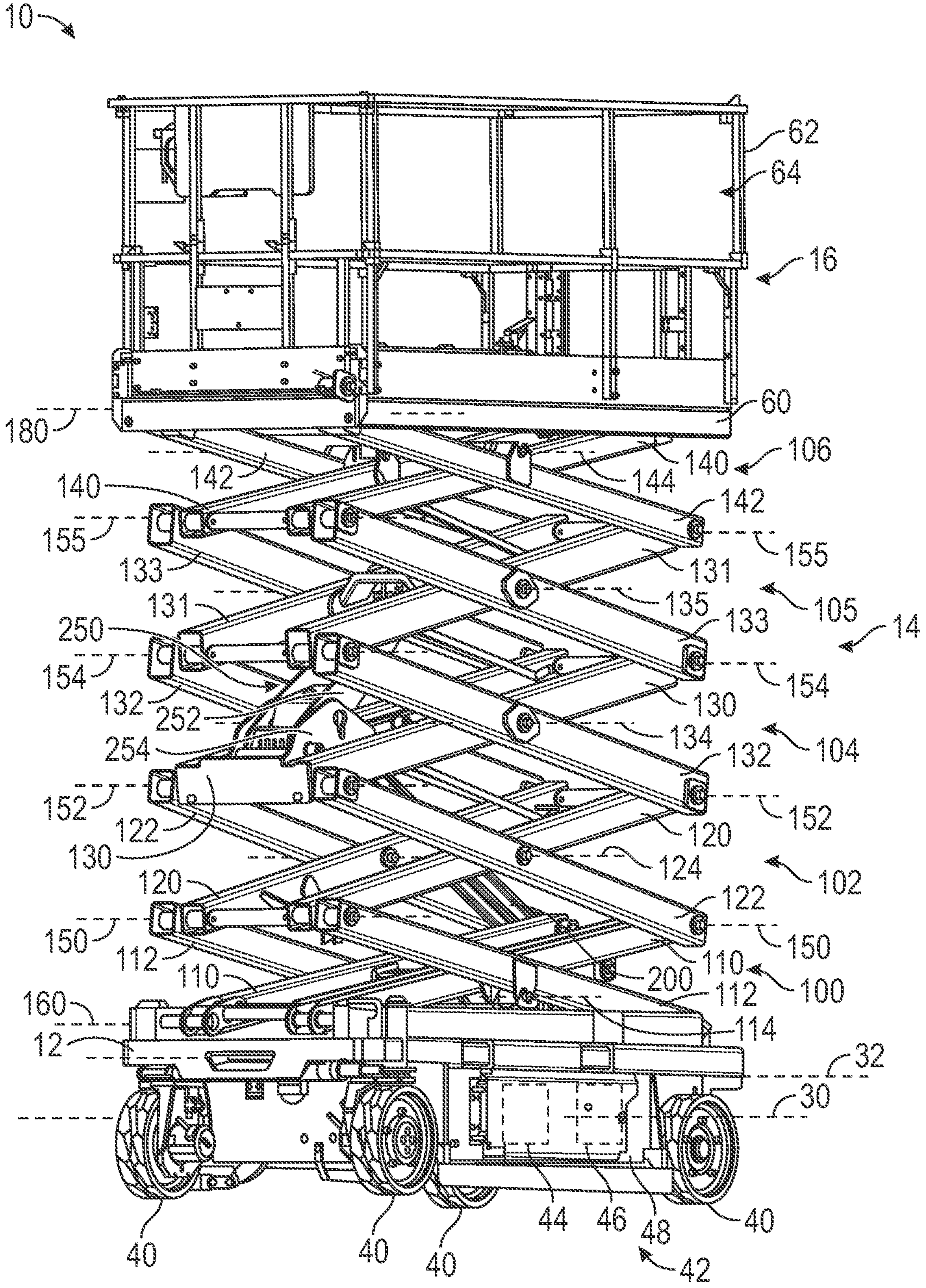
FIG. 1 is a perspective view of a lift device, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a scissor lift includes a base, a platform configured to support at least one operator, and a lift assembly coupled to the base and the platform and configured to raise and lower the platform relative to the base. The lift assembly includes a series of scissor layers arranged on top of one another. Each scissor layer includes a pair of inner scissor arms pivotally coupled to a pair of outer scissor arms. The inner scissor arms of each scissor layer are pivotally coupled to the outer scissor arms of the adjacent scissor layers. The bottom scissor layer is coupled to the base, and the top scissor layer is coupled to the platform. One or more actuators rotate the scissor arms relative to one another such that the overall length of the scissor assembly changes, raising and lowering the platform.

The scissor lift described herein utilizes a kicker assembly coupled to the one or more actuators to provide a two-stage mechanical advantage for raising and lowering the platform. The kicker assembly couples two scissor layers to at least one of the actuators. The kicker assembly includes a kicker rotatably coupled to the first scissor layer and slidably coupled to the second scissor layer by a roller. The one or more actuators are rotatably coupled to the kicker by an actuator pin, and in the first stage rotate the kicker relative to the first scissor layer such that the kicker slidably engages with the second scissor layer, imparting a vertical force on the second scissor layer for raising and lowering the platform. A kicker guide coupled to the first scissor layer receives the actuator pin in a slot. The length of the slot limits the rotation of the kicker. In the second stage, the actuator pin has reached the end of the slot such that the kicker guide no longer allows the kicker to rotate. Instead, as the actuator continues to impart a force on the kicker, the force from the actuator passes through the kicker guide and into the first scissor layer, raising and lowering the platform, while also disengaging the sliding connection between the kicker and the second scissor layer.

Within each scissor layer, the inner arms are pivotally coupled to the outer arms about a middle axis that extends laterally. If this middle axis is placed in the center of the inner arms and the outer arms, the distance between the bottom ends of the inner and outer arms will be the same as the distance between the top ends of the inner and outer arms. However, placing a pin in this location can have a negative effect on the strength of the inner arms and outer arms. If the lateral axis is offset above or below the center of the inner arms and the outer arms, the distance between the bottom ends of the inner and outer arms will not be the same as the distance between the top ends of the inner and outer arms. This results in longitudinal movement of the platform. This longitudinal movement is undesirable, as it can cause the platform to contact other objects. By way of example, if the scissor lift is placed adjacent a wall, this movement can cause the platform to contact the wall, potentially damaging the wall or the scissor lift. However, offsetting the pin is advantageous, as the reduction in strength caused by placing a pin in the centers of the scissor arms can be avoided.

The scissor lift described herein can utilize multiple scissor layers having vertically offset pins. The pins are placed such that the net vertical offset of the pins is zero. By way of example, if two of the pins were each offset downward two inches, another pin would be offset upward four inches. This arrangement prevents the longitudinal movement of the platform while still permitting the pins to be offset, increasing the strength of the scissor arms.

According to the exemplary embodiment shown in FIG. 1, a lift device (e.g., a scissor lift, an aerial work platform, etc.), shown as lift device 10, includes a chassis or base, shown as frame assembly 12. A lift assembly (e.g., a scissor assembly, etc.), shown as lift assembly 14, couples the frame assembly 12 to a work platform, shown as platform 16. The frame assembly 12 supports the lift assembly 14 and the platform 16, both of which are disposed directly above the frame assembly 12. In use, the lift assembly 14 extends and retracts to raise and lower the platform 16 relative to the frame assembly 12 between a fully lowered position and a fully raised position.

The frame assembly 12 defines a horizontal plane having a lateral axis 30 and a longitudinal axis 32. In some embodiments, the frame assembly 12 is rectangular, defining sides extending parallel to the lateral axis 30 and sides extending parallel to the longitudinal axis 32. In some embodiments, the frame assembly 12 is longer in a longitudinal direction than in a lateral direction. In some embodiments, the lift device 10 is configured to be stationary or semi-permanent (e.g., a system that is installed in one location at a work site for the duration of a construction project). In such embodiments, the frame assembly 12 may be configured to rest directly on the ground and/or the lift device 10 may not provide powered movement across the ground. In other embodiments, the lift device 10 is configured to be moved frequently (e.g., to work on different tasks, to continue the same task in multiple locations, to travel across a job site, etc.). Such embodiments may include systems that provide powered movement across the ground.

The lift device 10 is supported by a plurality of tractive assemblies 40, each including a tractive element (e.g., a tire, a track, etc.), that are rotatably coupled to the frame assembly 12. The tractive assemblies 40 may be powered or unpowered. As shown in FIG. 1, the tractive assemblies 40 are configured to provide powered motion in the direction of the longitudinal axis 32. One or more of the tractive assemblies 40 may be turnable or steerable to steer the lift device 10. In some embodiments, the lift device 10 includes a powertrain system 42. In some embodiments, the powertrain system 42 includes a primary driver 44 (e.g., an engine, an electric motor, etc.). A transmission may receive mechanical energy from the primary driver and provide an output to one or more of the tractive assemblies 40. In some embodiments, the powertrain system 42 includes a pump 46 configured to receive mechanical energy from the primary driver 44 and output a pressurized flow of hydraulic fluid. The pump 46 may supply mechanical energy (e.g., through a pressurized flow of hydraulic fluid) to individual motive drivers (e.g., hydraulic motors) configured to facilitate independently driving each of the tractive assemblies 40. In other embodiments, the powertrain system 42 includes an energy storage device (e.g., a battery, capacitors, ultra-capacitors, etc.) and/or is electrically coupled to an outside source of electrical energy (e.g., a power outlet connected to a power grid). In some such embodiments, one or more of the tractive assemblies 40 include an individual motive driver (e.g., a motor that is electrically coupled to the energy storage device, a hydraulic motor fluidly coupled to the pump 46 etc.) configured to facilitate independently driving one or more of the tractive assemblies 40. The outside source of electrical energy may charge the energy storage device or power the motive drivers directly. The powertrain system 42 may additionally or alternatively provide mechanical energy (e.g., using the pump 46, by supplying electrical energy, etc.) to one or more actuators of the lift device 10 (e.g., a leveling actuator, the lift actuator 200, etc.). One or more components of the powertrain system 42 may be housed in an enclosure, shown as housing 48. The housing 48 is coupled to the frame assembly 12 and extends from a side of the lift device 10 (e.g., a left or right side). The housing 48 may include one or more doors to facilitate access to components of the powertrain system 42.

The platform 16 includes a support surface, shown as deck 60, defining a top surface configured to support operators and/or equipment and a bottom surface opposite the top surface. The bottom surface and/or the top surface extend in a substantially horizontal plane. A thickness of the deck 60 is defined between the top surface and the bottom surface. The bottom surface is coupled to a top end of the lift assembly 14. In some embodiments, the deck 60 is rectangular. In some embodiments, the deck 60 has a footprint that is substantially similar to that of the frame assembly 12.

A series of guards or railings, shown as guard rails 62, extend upwards from the deck 60. The guard rails 62 extend around an outer perimeter of the deck 60, partially or fully enclosing a supported area on the top surface of the deck 60 that is configured to support operators and/or equipment. The guard rails 62 provide a stable support for the operators to hold and facilitate containing the operators and equipment within the supported area. The guard rails 62 define one or more openings 64 through which the operators can access the deck 60. The opening 64 may be a space between two guard rails 62 along the perimeter of the deck 60, such that the guard rails 62 do not extend over the opening 64. Alternatively, the opening 64 may be defined in a guard rail 62 such that the guard rail 62 extends across the top of the opening 64. In some embodiments, the platform 16 includes a door that selectively extends across the opening 64 to prevent movement through the opening 64. The door may rotate (e.g., about a vertical axis, about a horizontal axis, etc.) or translate between a closed position and an open position. In the closed position, the door prevents movement through the opening 64. In the open position, the door does not prevent movement through the opening 64.

The lift assembly 14 is configured to extend and retract, raising and lowering the platform 16 relative to the frame assembly 12. The lift assembly 14 is selectively repositionable between a fully retracted position and a fully extended position. The fully retracted position corresponds to a fully lowered position of the platform 16. The fully lowered position may be used by an operator when entering or exiting the platform 16 (e.g., using the access assembly 20) or when transporting the lift device 10. The fully extended position corresponds to a fully raised position of the platform 16. The fully raised position and any positions between the fully raised position and the fully lowered position may be used by the operator when accessing an elevated area (e.g., to perform construction work, to visually inspect an elevated object, etc.).

The lift assembly 14 includes a series of subassemblies, shown as scissor layers. Specifically, the lift assembly 14 includes a first scissor section, shown as bottom scissor layer 100, one or more middle scissor layers including a second scissor section, shown as second scissor layer 102, and a third scissor section, shown as third scissor layer 104, and a fourth scissor section, shown as fourth scissor layer 105. The lift assembly 14 also includes a fifth scissor section, shown as top scissor layer 106. In other embodiments, the lift assembly 14 includes more or fewer middle scissor layers (e.g., zero, three, etc.). The bottom scissor layer 100 is directly coupled to the frame assembly 12 and to the second scissor layer 102. The second scissor layer 102 is directly coupled to the bottom scissor layer 100 and the third scissor layer 104. The third scissor layer 104 is directly coupled to the second scissor layer 102 and the fourth scissor layer 105. The fourth scissor layer 105 is directly coupled to the third scissor layer 104 and the top scissor layer 106. The top scissor layer 106 is directly coupled to the platform 16 and to the fourth scissor layer 105.

Each of the scissor layers includes a pair of first scissor arms or scissor members (e.g., tubular members, solid members, etc.), shown as inner arms, and a pair of second scissor arms or scissor members (e.g., tubular members, solid members, etc.), shown as outer arms. Each inner arm is coupled (e.g., fixedly) to the other inner arm within that scissor layer. Each outer arm is coupled (e.g., fixedly) to the other outer arm within that scissor layer. The inner arms of each scissor layer are pivotally coupled (e.g., by one or more pins or rods) to the corresponding outer arms of that scissor layer near the centers of both the inner arms and the outer arms. Accordingly, the inner arms of each layer pivot relative to the outer arms of that scissor layer about a lateral axis. Specifically, the bottom scissor layer 100 includes inner arms 110 and outer arms 112 that pivot relative to one another about a lateral axis, shown as middle axis 114. The second scissor layer 102 includes inner arms 120 and outer arms 122 that pivot relative to one another about a lateral axis, shown as middle axis 124. The third scissor layer 104 includes inner arms 130 and outer arms 132 that pivot relative to one another about a lateral axis, shown as middle axis 134. The fourth scissor layer 105 includes inner arms 131 and outer arms 133 that pivot relative to one another about a lateral axis, shown as middle axis 135. The top scissor layer 106 includes inner arms 140 and outer arms 142 that pivot relative to one another about a lateral axis, shown as middle axis 144.

The scissor layers are stacked atop one another to form the lift assembly 14. Each pair of inner arms and each pair of outer arms has a top end and a bottom end. The ends of the inner arms and the outer arms are pivotally coupled (e.g., by one or more pins or rods) to the adjacent ends of the inner or outer arms of the adjacent scissor layers. Each set of inner arms is directly pivotally coupled to one or more sets of outer arms. This facilitates spacing each pair of inner arms a first distance apart from one another and spacing each pair of outer arms a second distance apart from one another, where the second distance is greater than the first distance. This facilitates ensuring that the fully lowered position is as low as possible, increasing the accessibility of the platform 16 and making the lift device 10 more compact.

The upper ends of the outer arms 112 are pivotally coupled to the lower ends of the inner arms 120 such that they rotate relative to one another about a lateral axis, shown as end axis 150. The upper ends of the inner arms 110 are pivotally coupled to the lower ends of the outer arms 122 such that they rotate relative to one another about another end axis 150. The upper ends of the outer arms 122 are pivotally coupled to the lower ends of the inner arms 130 such that they rotate relative to one another about a lateral axis, shown as end axis 152. The upper ends of the inner arms 120 are pivotally coupled to the lower ends of the outer arms 132 such that they rotate relative to one another about another end axis 152. The upper ends of the outer arms 132 are pivotally coupled to the lower ends of the inner arms 131 such that they rotate relative to one another about a lateral axis, shown as end axis 153. The upper ends of inner arms 130 are pivotally coupled to the lower ends of outer arms 133 such that they rotate relative to one another about another end axis 153. The upper ends of the outer arms 133 are pivotally coupled to the lower ends of the inner arms 140 such that they rotate relative to one another about a lateral axis, shown as end axis 155. The upper ends of the inner arms 131 are pivotally coupled to the lower ends of the outer arms 142 such that they rotate relative to one another about another end axis 155.

The upper ends of the outer arms 142 are pivotally coupled to the deck 60 of the platform 16 such that the outer arms 142 rotate relative to the deck 60 about a lateral axis, shown as end axis 180. The end axis 180 is fixed to the platform 16 such that the upper ends of the outer arms 142 are translationally fixed relative to the platform 16. In one embodiment, a pair of pins couple the outer arms 142 to the platform 16. The pins may each extend along the end axis 180 through one of the outer arms 142 and a portion of the deck 60.

Figure 2:
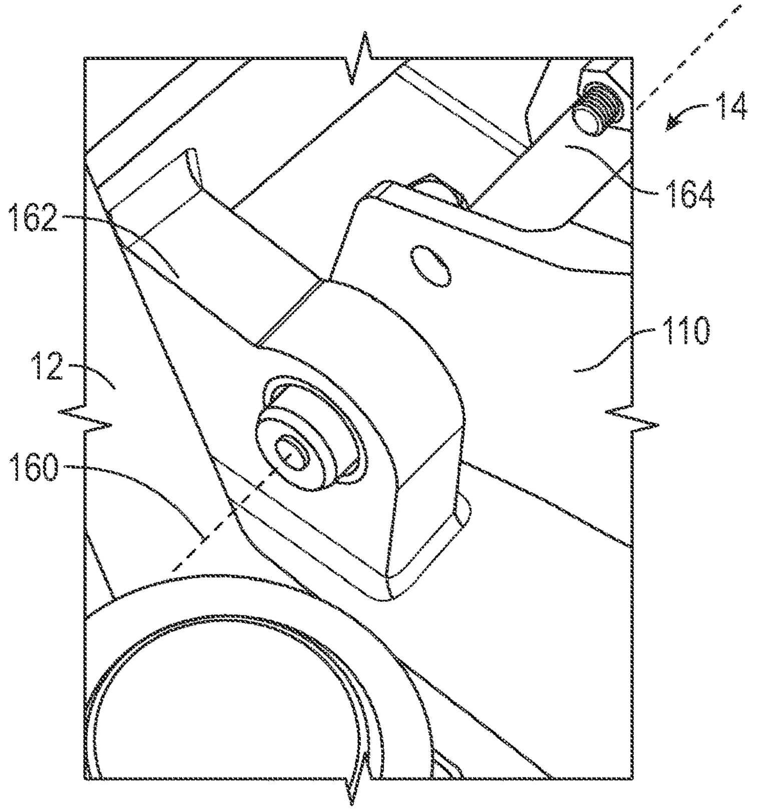
FIG. 2 is a perspective view of a frame and a lift assembly of the lift device of FIG. 1, according to an exemplary embodiment.

Referring to FIG. 2, the lower ends of the inner arms 110 are pivotally coupled to the frame assembly 12 such that the inner arms 110 rotate relative to the frame assembly 12 about a lateral axis, shown as end axis 160. The end axis 160 is fixed to the frame assembly 12 such that the lower ends of the inner arms 110 are translationally fixed relative to the frame assembly 12. A pair of bosses, shown as bearing blocks 162, are coupled (e.g., welded, fastened, etc.) to the frame assembly 12. The bearing blocks 162 are each configured to receive a rod or pin, shown as pin 164. The bearing blocks 162 and the pins 164 may be configured to facilitate rotation of the pins 164 about the end axis 160. The pins 164 each extend along the end axis 160 through one of the bearing blocks 162 and the corresponding inner arms 110. The pins 164 and the bearing blocks 162 pivotally couple the inner arms 110 to the frame assembly 12.

Figure 3:
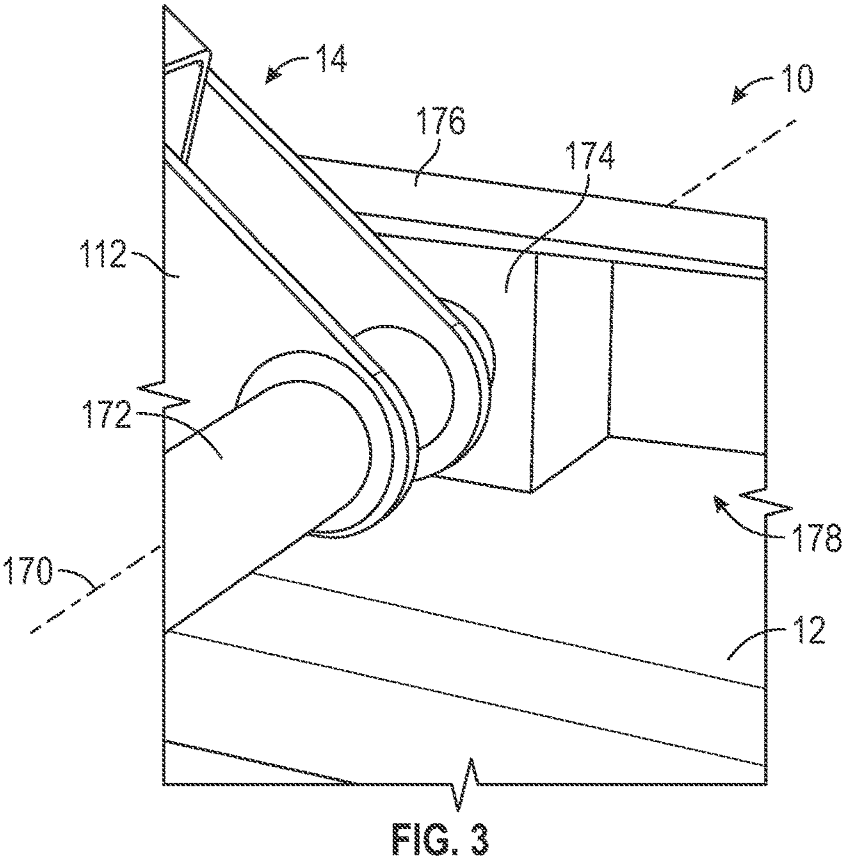
FIG. 3 is another perspective view of the frame and the lift assembly of FIG. 1, according to an exemplary embodiment.

Referring to FIG. 3, the lower ends of the outer arms 112 are pivotally and slidably coupled to the frame assembly 12 such that the outer arms 112 rotate relative to the frame assembly 12 about a lateral axis, shown as end axis 170. The end axis 170 is translatable longitudinally relative to the frame assembly 12 such that the lower ends of the outer arms 112 are slidable longitudinally relative to the frame assembly 12. A tubular member, shown as rod 172, extends laterally between both of the outer arms 112. The rod 172 is coupled (e.g., welded, fastened, etc.) to the outer arms 112. The rod 172 further extends laterally outside of the outer arms 112. Each end of the rod 172 is received within an aperture defined by a block, shown as sliding block 174. The sliding blocks 174 are accordingly pivotally coupled to the rod 172. A pair of frame members, shown as channels 176 are coupled to (e.g., fastened to, welded to, integrally formed with, etc.) the frame assembly 12. The channels 176 extend longitudinally along the frame assembly 12. The channels 176 each define a recess 178 that receives the sliding block 174. Each of the recesses 178 face toward a longitudinal centerline of the lift device 10 such that the sliding blocks 174 are captured laterally by the channels 176. The sliding blocks 174 are free to translate longitudinally along the channels 176 to permit pivoting of the outer arms 112 relative to the inner arms 110.

Figure 4:
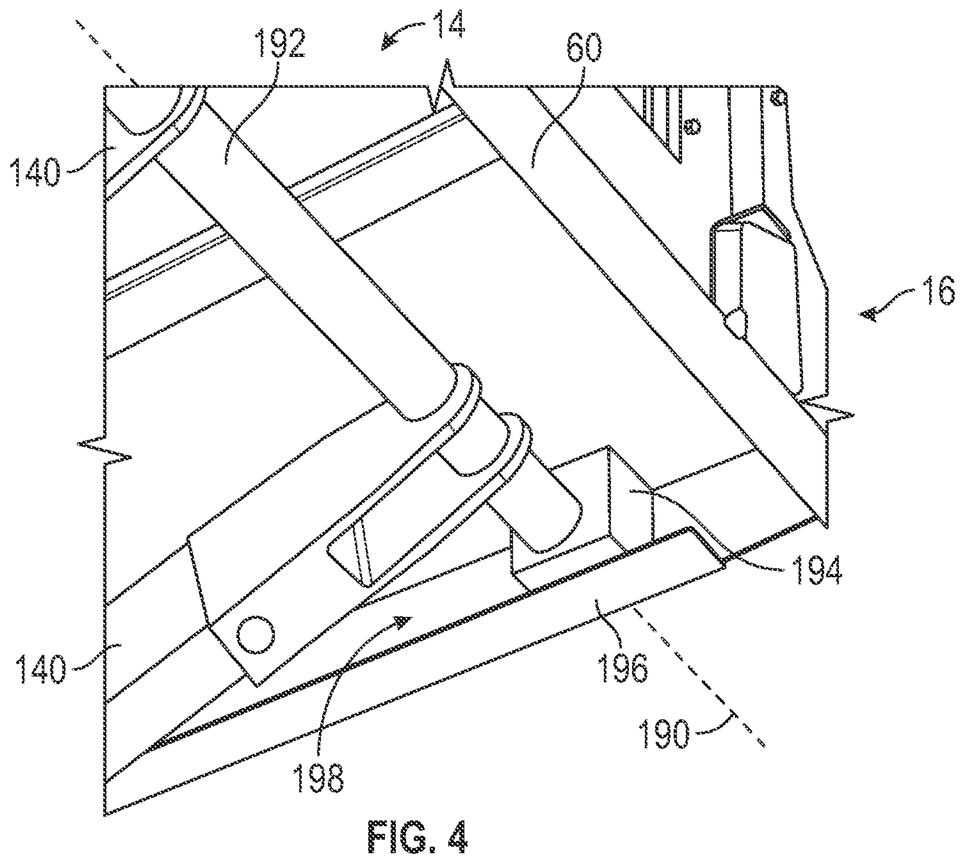
FIG. 4 is a perspective view of a platform of the lift device of FIG. 1, according to an exemplary embodiment.

Referring to FIG. 4, the upper ends of the inner arms 140 are pivotally and slidably coupled to the deck 60 of the platform 16 such that the inner arms 140 rotate relative to the deck 60 about a lateral axis, shown as end axis 190. The end axis 190 is translatable longitudinally relative to the platform 16 such that the upper ends of the inner arms 140 are slidable longitudinally relative to the platform 16. A tubular member, shown as rod 192, extends laterally between both of the inner arms 140. The rod 192 is coupled (e.g., welded, fastened, etc.) to the inner arms 140. The rod 192 further extends laterally outside of the inner arms 140. Each end of the rod 192 is received within an aperture defined by a block, shown as sliding block 194. The sliding blocks 194 are accordingly pivotally coupled to the rod 192. A pair of frame members, shown as channels 196 are coupled (e.g., fastened, welded, integrally formed with, etc.) to the frame assembly 12. The channels 196 extend longitudinally along the platform 16. The channels 196 each define a recess 198 that receives the sliding block 194. Each of the recesses 198 face toward a longitudinal centerline of the lift device 10 such that the sliding blocks 194 are captured laterally by the channels 196. The sliding blocks 194 are free to translate longitudinally along the channels 196 to permit pivoting of the inner arms 140 relative to the outer arms 142.

Figure 5:
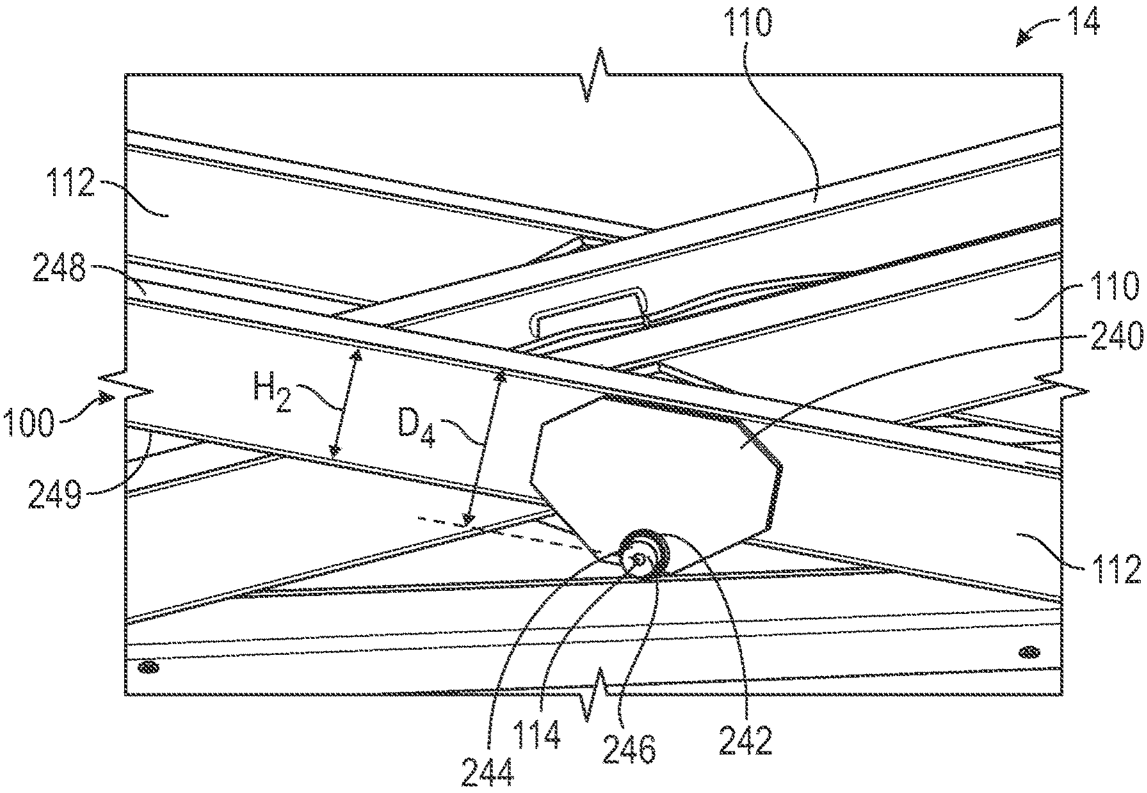
FIG. 5 is another side view of the lift assembly of FIG. 1, according to an exemplary embodiment.
Figure 6:
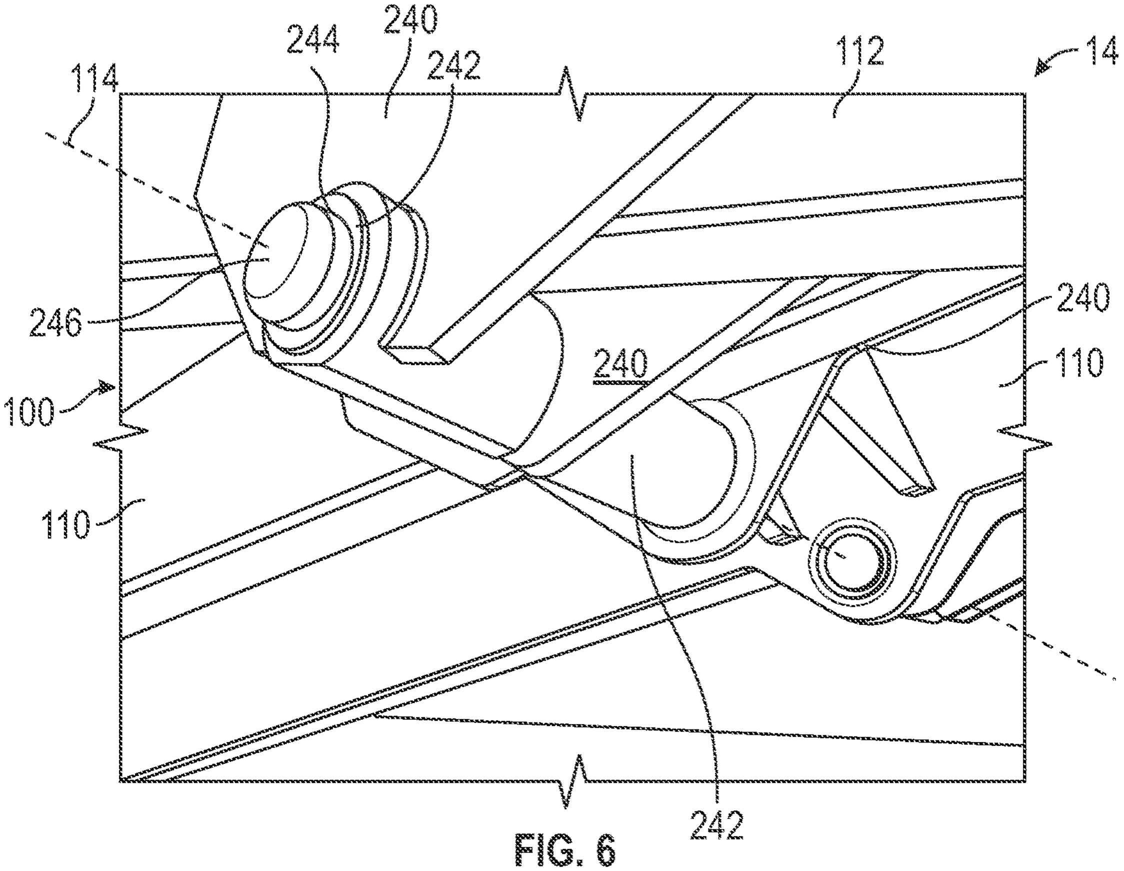
FIG. 6 is bottom perspective view of the lift assembly of FIG. 1, according to an exemplary embodiment.
Figure 7:
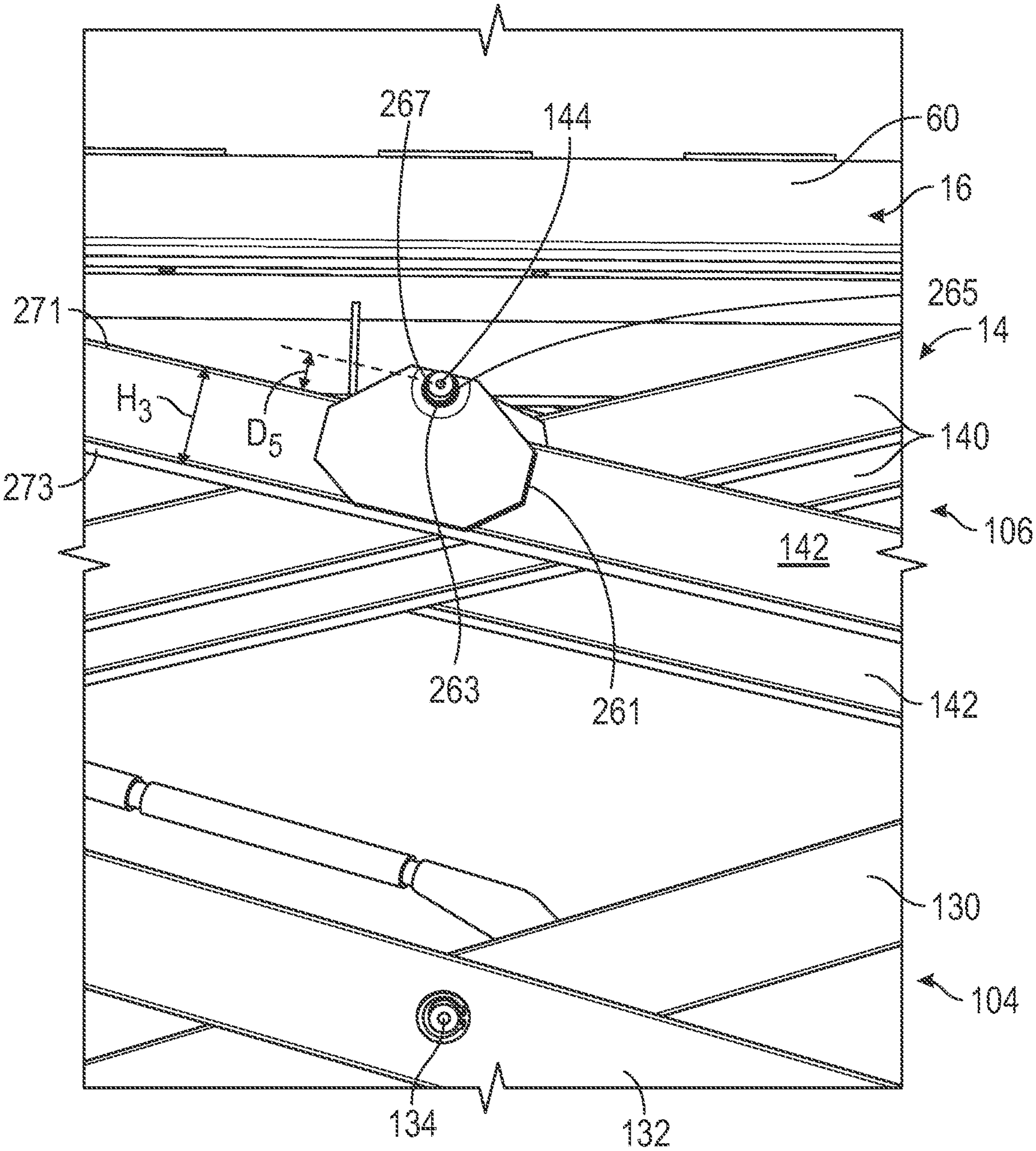
FIG. 7 is another side view of the lift assembly of FIG. 1, according to an exemplary embodiment.

Referring to FIGS. 5-7, the scissor arms are coupled to one another by a series of pins. Each of the pins extends through a laterally extending aperture. The laterally extending apertures are centered about and extend parallel to the end and middle axes described herein (e.g., the end axis 150, the middle axis 114, etc.) and as described in greater detail in U.S. application Ser. No. 16/811,272, filed Mar. 6, 2020, the entire disclosure of which is incorporated by reference herein.

Referring to FIGS. 5 and 6, a pair of supports, shown as side plates 240 are each coupled (e.g., welded, fastened, etc.) to opposite sides of the outer arm 112. The side plates 240 extend below the outer arm 112. A bearing member, shown as bottom middle bushing 242, extends through and is coupled to the side plates 240. The bottom middle bushing 242 defines an aperture, shown as bottom middle pin aperture 244. The inner arm 110 utilizes a similar set of side plates 240 and a similar bottom middle bushing 242. The bottom middle pin aperture 244 receives a rod or pin, shown as bottom middle pin 246. The bottom middle pin 246 also extends through the bottom middle pin aperture 244 of the corresponding bottom middle bushing 242 of the inner arm 110, pivotally coupling the inner arm 110 and the outer arm 112. One or more retraining members (e.g., retaining rings, machined shoulders, clamping collars, fasteners, etc.), may be coupled to the bottom middle pin 246 to limit the lateral movement of the bottom middle pin 246 relative to the inner arm 110 and the outer arm 112. The bottom middle bushing 242, the bottom middle pin aperture 244, and the bottom middle pin 246 are centered about and extend parallel to (e.g., are aligned with) the middle axis 114. The outer arm 112 has a height $H_2$ defined between a top surface 248 and a bottom surface 249 of the outer arm 112. The middle axis 114 is offset a distance $D_4$ below the top surface 248 of the outer arm 112. The distance $D_4$ is greater than the height $H_1$ such that the middle axis 114 is vertically below the bottom surface 249. The bottom middle bushing 242, the bottom middle pin aperture 244, and/or the bottom middle pin 246 are positioned entirely below the bottom surface 249. Accordingly, the bottom middle bushing 242, the bottom middle pin aperture 244, and/or the bottom middle pin 246 do not extend through the outer arm 112. This pivotal coupling arrangement may increase the strength of the outer arm 112 (e.g., relative to the outer arm 122), because no holes are required through the outer arm 112. The bottom middle bushing 242 is similarly positioned on the inner arm 110. The other outer arm 112 and inner arm 110 may utilize a similar bushing and pin arrangement.

Referring to FIG. 7, a pair of supports, shown as side plates 261 are each coupled (e.g., welded, fastened, etc.) to opposite sides of the outer arm 142. The side plates 261 extend above the outer arm 142. A bearing member, shown as top middle bushing 263, extends through and is coupled to the side plates 261. The top middle bushing 263 defines an aperture, shown as top middle pin aperture 265. The inner arm 140 includes similar set of side plates 261 and a similar top middle bushing 263. The top middle pin aperture 265 receives a rod or pin, shown as top middle pin 267. The top middle pin 267 also extends through the top middle pin aperture 265 of the corresponding top middle bushing 263 of the inner arm 140, pivotally coupling the inner arm 140 and the outer arm 142. One or more retraining members (e.g., retaining rings, machined shoulders, clamping collars, fasteners, etc.), may be coupled to the top middle pin 267 to limit the lateral movement of the top middle pin 267 relative to the inner arm 140 and the outer arm 142. The top middle bushing 263, the top middle pin aperture 265, and the top middle pin 267 are centered about and extend parallel to (e.g., are aligned with) the middle axis 144. The outer arm 142 has a height $H_3$ defined between a top surface 271 and a bottom surface 273 of the outer arm 142. The middle axis 144 is offset a distance $D_5$ above the top surface 271 of the outer arm 142. The top middle bushing 263, the top middle pin aperture 265, and/or the top middle pin 267 are positioned entirely above the top surface 271. Accordingly, the top middle bushing 263, the top middle pin aperture 265, and/or the top middle pin 267 do not extend through the outer arm 142. This pivotal coupling arrangement may increase the strength of the outer arm 142 (e.g., relative to the outer arm 122), because no holes are required through the outer arm 142. The top middle bushing 263 is similarly positioned on the inner arm 140. The other outer arm 142 and inner arm 140 may utilize a similar bushing and pin arrangement.

Figure 8:
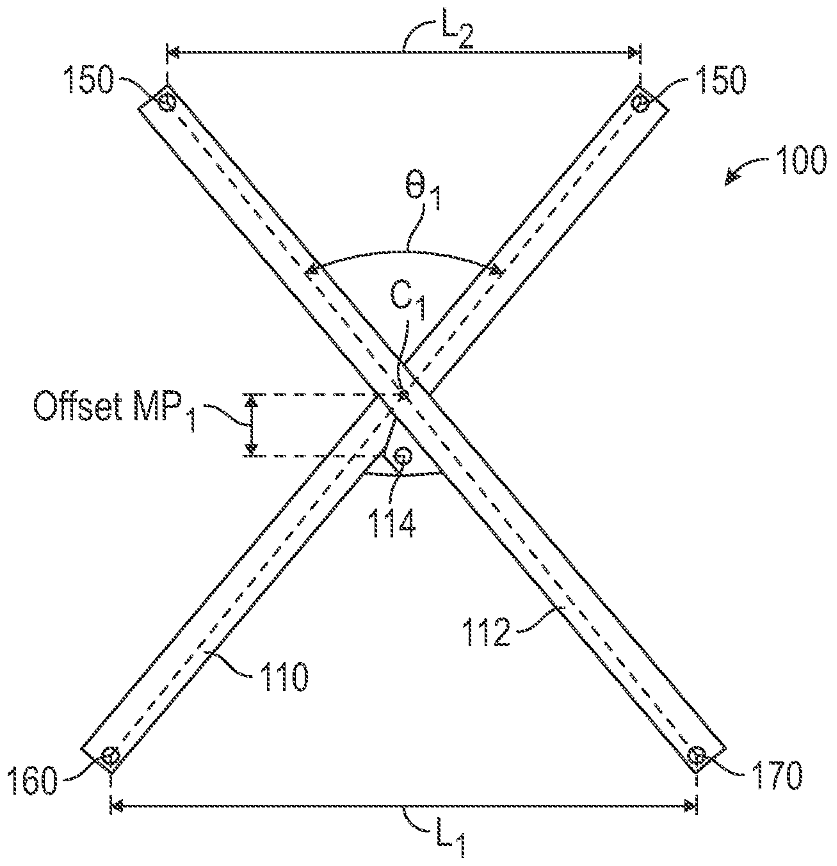
FIG. 8 is a side view of a bottom scissor layer of the lift assembly of FIG. 1 in a partially extended position, according to an exemplary embodiment.

A point, referred to herein as an end axis center point, is defined for each of the scissor layers. The end axis center point is a point centered between each of the end axes corresponding to that scissor layer. The end axis center point of a scissor layer is defined by (a) within a plane perpendicular to the lateral axis 30, defining (e.g., drawing) a first straight line between the end axes of the inner arms of that scissor layer and (b) within the plane, defining a second straight line between the end axes of the outer arms of that scissor layer. The point at which these two lines intersect is the end axis center point. By way of example, the end axis center point for the second scissor layer 102 is shown in FIG. 8. To locate the end axis center point, a first straight line is drawn between the end axis 150 and the end axis 152 of the inner arms 120. A second straight line is drawn between the end axis 150 and the end axis 152 of the outer arms 122. The end axis center point for the second scissor layer 102, shown as point $C_2$, is the point where these two lines intersect. Using a similar process, the end axis center points of the bottom scissor layer 100, the third scissor layer 104, and the top scissor layer 106 can be located.

Figure 9:
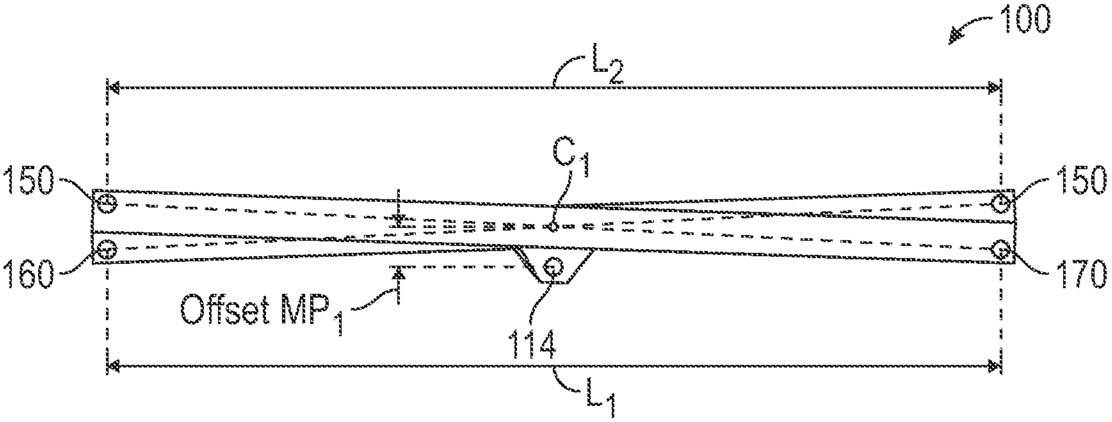
FIG. 9 is a side view of the bottom scissor layer of FIG. 8 in a fully retracted position, according to an exemplary embodiment.
Figure 10:
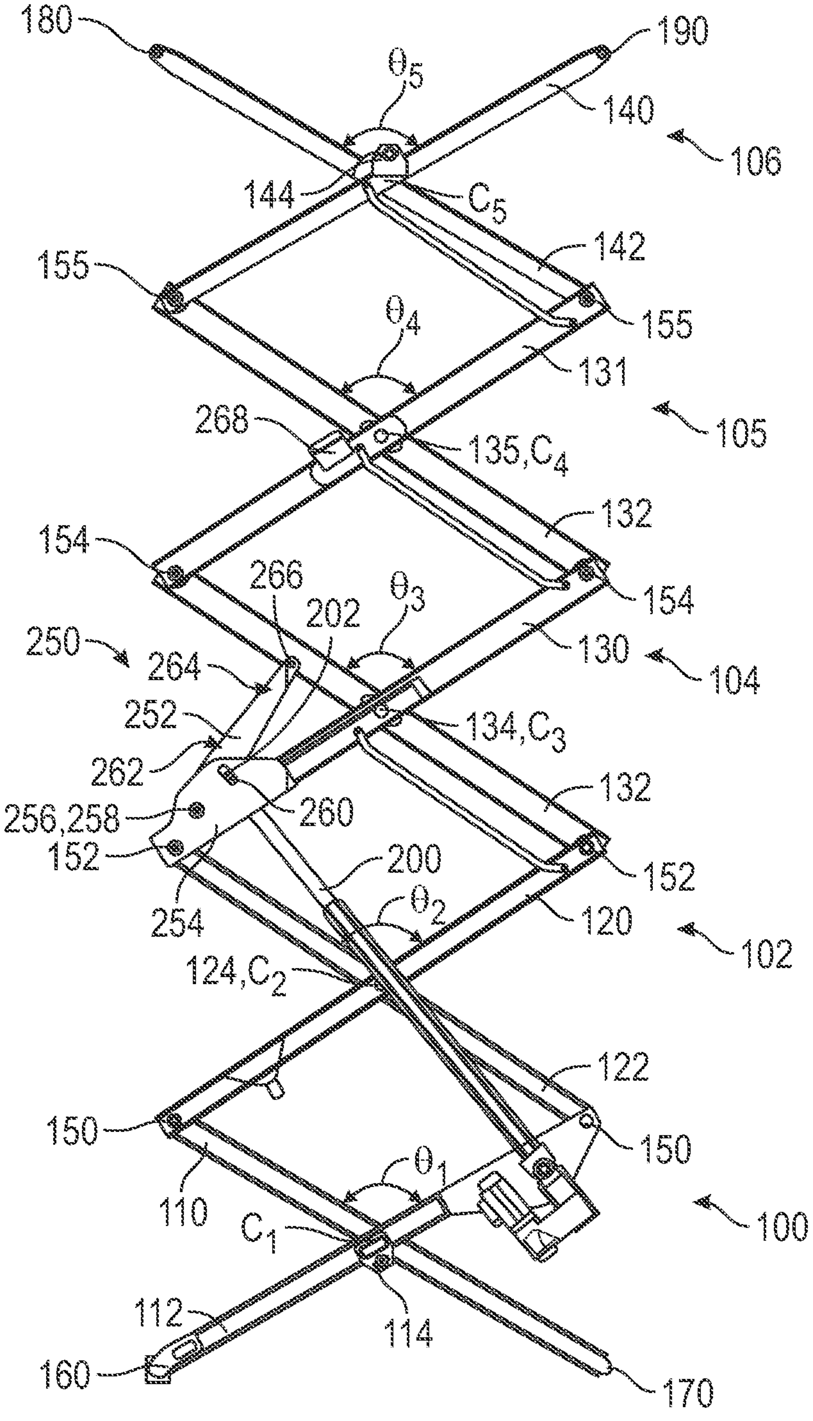
FIG. 10 is a side view of the lift assembly of FIG. 1 in a fully extended position, according to an exemplary embodiment.
Figure 11:
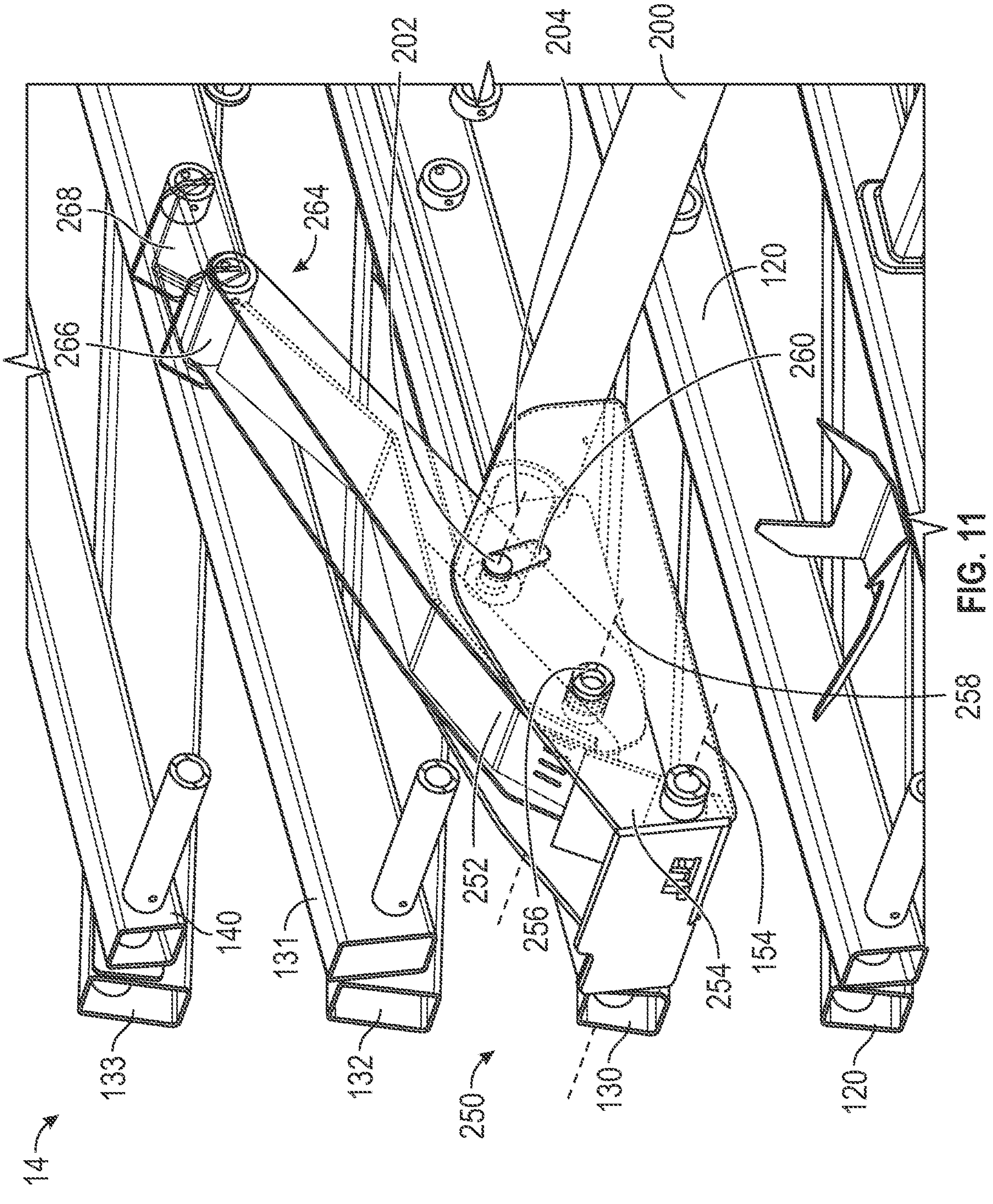
FIG. 11 is a perspective view of the lift assembly of FIG. 1 in a partially extended position, according to an exemplary embodiment.

FIG. 8 illustrates the bottom scissor layer 100 in a partially extended position. FIG. 9 illustrates the bottom scissor layer 100 in a fully retracted position. The end axis center point $C_1$ is offset a distance $OffsetMP_1$ vertically above the middle axis 114 (i.e., $OffsetMP_1>0$). A longitudinal distance $L_1$ is shown between the end axis 160 and the end axis 170, and a longitudinal distance $L_2$ is shown between the end axis 150. As the lift assembly 14 moves from the fully retracted position toward the fully extended position, the distance $L_1$ and the distance $L_2$ decrease. Due to the relative positioning of the end axis center point $C_1$ and the middle axis 114, the distance $L_2$ decreases more rapidly than the distance $L_1$. Accordingly, while the distance $L_1$ and the distance $L_2$ may be equal in the fully retracted position, the distance $L_1$ is greater than the distance $L_2$ in the partially extended position. Similarly, in the top scissor layer 106, end axis center pointer can be offset vertically below the middle axis 144 (i.e., $OffsetMP_4<0$), as shown in FIG. 10 and described in greater detail in U.S. application Ser. No. 16/811,272, filed Mar. 6, 2020, the entire disclosure of which is incorporated by reference herein.

In the fully retracted position, the distances between the end axes of each inner arm and each outer arm are substantially equal. By way of example, (a) the distance between the end axis 180 and the end axis 154 of the outer arm 142, (b) the distance between the end axis 152 and the end axis 150 of the outer arm 122, and (c) the distance between the end axis 160 and the end axis 150 of the inner arm 110 are all substantially equal. Because these distances are all equal, the magnitude of each middle pin offset distance (i.e., $|OffsetMP|$) determines the angle between the corresponding inner arms and outer arms of that scissor layer. As shown in FIGS. 8 and 10, an angle $\theta$ is defined between the straight lines used to define the end axis center point. Specifically, the bottom scissor layer 100 has an angle $\theta_1$, the second scissor layer 102 has an angle $\theta_2$, the third scissor layer 104 has an angle $\theta_3$, the fourth scissor layer 105 has an angle $\theta_4$ and the top scissor layer 106 has an angle $\theta_5$. In the embodiment shown in FIG. 10, the middle pin offset distances of the second scissor layer 102, the third scissor layer 104, and the fourth scissor layer 105 are all zero (i.e., $OffsetMP_2=OffsetMP_3=OffsetMP_4=0$). Accordingly, the angles of the second scissor layer 102, the third scissor layer 104, and the fourth scissor layer 105 are equal (i.e., $\theta_2=\theta_3=\theta_4$). The middle pin offset distances of the bottom scissor layer 100 and the top scissor layer 106 have equal magnitudes (i.e., $|OffsetMP_1|=|OffsetMP_5|$). Accordingly, the angles of the bottom scissor layer 100 and the top scissor layer 106 are equal (i.e., $\theta_1=\theta_5$).

In the fully retracted position, the end axes are vertically aligned with one another in the fully retracted position. Specifically, a first vertical line can be drawn through the middle axis 114, the middle axis 124, the middle axis 134, the middle axis 135, the middle axis 144, and each of the end axis center points. In this embodiment, the end axes are vertically aligned with one another in the fully retracted position. Specifically, a second vertical line can be drawn through the end axis 180, the end axis 155, the end axis 154, the end axis 152, the end axis 150, and the end axis 160 on one side of the lift assembly 14, and a third vertical line can be drawn through the end axis 190, the end axis 155, the end axis 154, the end axis 152, the end axis 150, and the end axis 170 on the other side of the lift assembly 14.

Referring to FIG. 10, the lift assembly 14 is shown in the fully extended position. In this embodiment, the middle axes are all vertically aligned with one another. However, the end axes are not all vertically aligned with one another. The end axis 160 and the end axis 180 are aligned with one another. The end axis 150, the end axis 152, the end axis 154, and the end axis 155 are also vertically aligned with one another. However, the end axis 150, the end axis 152, the end axis 154, and the end axis 155 are offset longitudinally inward from the end axis 180 and the end axis 190. This variation in vertical alignment is due to the variation in middle pin offset distances (i.e., OffsetMP) between each scissor layer. In the bottom scissor layer 100, the end axis center point $C_1$ is offset above the middle axis 114 (i.e., $OffsetMP_1>0$), so the end axis 150 is offset longitudinally inward from the end axis 160. In the second scissor layer 102, the third scissor layer 104, and the fourth scissor layer 105, the end axis center point $C_2$, the end axis center point $C_3$, and the end axis center point $C_4$ are vertically aligned with the middle axis 124, the middle axis 134, and the middle axis 135, respectively (i.e., $OffsetMP_2=OffsetMP_3=OffsetMP_4=0$). Accordingly, the end axis 150, the end axis 152, the end axis 154, and the end axis 155 are all in the same longitudinal position. In the top scissor layer 106, the end axis center point $C_5$ is offset below the middle axis 144 (i.e., $OffsetMP_5<0$), so the end axis 180 is offset longitudinally inward from the end axis 154. As shown in FIG. 10, the middle pin offset distances of the top scissor layer 106 and the bottom scissor layer 100 have equal magnitudes (i.e., $|OffsetMP_1|=|OffsetMP_5|$). Specifically, the middle pin offset distances of the top scissor layer 106 and the bottom scissor layer 100 have equal magnitudes but are offset in opposite directions (i.e., $OffsetMP_1+OffsetMP_5=0$). Accordingly, the longitudinal offsets caused by the top scissor layer 106 and the bottom scissor layer 100 cancel one another out, keeping the end axis 160 and the end axis 180 vertically aligned.

Referring now to FIGS. 1 and 10-14 an actuator (e.g., a hydraulic cylinder, a pneumatic cylinder, a motor-driven leadscrew, etc.), shown as lift actuator 200, is configured to extend and retract the lift assembly 14. As shown in FIG. 1, the lift assembly 14 includes one lift actuator 200, and the lift actuator 200 is a hydraulic cylinder fluidly coupled to the pump 46. The lift actuator 200 is pivotally coupled to the inner arms 110 at one end (e.g., a cap end) and pivotally coupled to the inner arms 130 at the opposite end (e.g., a rod end) via a kicker assembly, shown as kicker assembly 250. In other embodiments, the lift assembly 14 includes more or fewer lift actuators 200 and/or the lift actuator 200 is otherwise arranged. The lift actuator 200 is configured to selectively reposition the lift assembly 14 between the fully extended and fully retracted positions. In some embodiments, extension of the lift actuator 200 moves the platform 16 vertically upward (extending the lift assembly 14), and retraction of the lift actuator 200 moves the platform 16 vertically downward (retracting the lift assembly 14). In other embodiments, extension of the lift actuator 200 retracts the lift assembly 14, and retraction of the lift actuator 200 extends the lift assembly 14. The lift device 10 may include various components configured to drive the lift actuator 200 (e.g., pumps, valves, compressors, motors, batteries, voltage regulators, etc.).

The kicker assembly 250 is configured to provide a mechanical advantage to the action of lift actuator 200 during the initial stages of extending the lift assembly 14, when the lift actuator 200 must work the hardest to extend the lift assembly 14. The kicker assembly 250 includes a kicker weldment (e.g., member, lever, etc.) shown as kicker 252. The kicker is coupled to the inner arms 130 by an intermediate member (e.g., plate, support, etc.) shown as kicker guide 254. The kicker guide 254 can be a plate coupled (e.g., bolted, welded, etc.) or it can be integral to one of the inner arms 130. For the purposes of illustration, in FIG. 12 the kicker guide 254 is transparent to illustrate the elements behind it. In some embodiments, a kicker guide 254 can be coupled to each inner arm 130 and the actuator pin 202 can extend laterally through both sides of the kicker 252 to be received by both kicker plates 268. While the kicker assembly 250 is shown with reference to the third scissor layer 104, it should be understood that in some embodiments the kicker assembly could be installed on another scissor layer (e.g., the bottom scissor layer 100, the second scissor layer 102, the fourth scissor layer 105, etc.). The kicker 252 can be pivotally coupled to the kicker guide 254 by a rotatable connection (e.g., pin, bearing, etc.), shown as kicker pivot pin 256 such that the kicker 252 can rotate relative to the inner arms 130 about an axis, shown as the kicker axis 258.

The kicker 252 is rotated around the kicker axis 258 by the lift actuator 200. The lift actuator 200 is pivotally coupled to the kicker 252 at the rod end of the lift actuator 200 via a rotatable connection (e.g., pin, bearing, etc.), shown as actuator pin 202 such that the kicker 252 can rotate relative to the actuator pin 202 about an axis, shown as actuator pin axis 204. The actuator pin axis 204 is offset from the kicker axis 258 to create a moment arm around the kicker axis 158. For example, as the lift actuator 200 engages with the kicker 252 at via the actuator pin 202 the kicker 252 rotates around the kicker axis 258. The actuator pin 202 is coupled to the kicker 252 such that the actuator pin 202 also rotates around the kicker axis 258. The actuator pin axis 204 travels an arcuate (e.g., circular, semi-circular, rounded, etc.) path around the kicker axis 258.

The actuator pin 202 extends through the kicker 252, such that at least a portion (e.g., 1 inch, 2 inch, 10%, 20%, etc.) of the actuator pin 202 extends beyond the outer perimeter of the kicker 252. The exposed portion of the actuator pin 202 is received by the kicker guide 254 in a slot (e.g., indentation, cut-out, hole, path, etc.) shown as slot 260. In some embodiments, the actuator pin 202 couples the lift actuator 200 with the kicker 252, and different pin extends from the kicker 252 and is received by the slot 260 of the kicker guide 254. The slot 260 of the kicker guide 254 is shaped to allow the kicker 252 to rotate. For example, the slot 260 can be arcuate to allow the actuator pin 202 to follow its natural arcuate path as the kicker 252, and the actuator pin 202 coupled to the kicker 252, rotate around the kicker axis 258.

The slot 260 can be configured to act as a stop on the rotation of the kicker 252. For example, the actuator pin 202 extends into the slot 260 and its allowed travel is limited by a length of the slot 260. The actuator pin 202 is coupled to the kicker 252, such that the kicker 252 can only rotate as far as the actuator pin 202 is allowed to move, such that the shape of the slot 260 can determine the amount of rotation (e.g., degrees) the kicker 252 is allowed to rotate. In some embodiments, the slot 260 follows a substantially (e.g., +/−10%) arcuate or circular path, such that the slot does not provide resistance to the path of the actuator pin 202 until the actuator pin 202 hits a first end or a second end of the slot 260. In some embodiments, the slot 260 includes an impediment (e.g., a bump, cliff, protrusion etc.) that increases the force required for the actuator pin 202 to overcome. In some embodiments, the kicker 252 can be configured to include the slot 260 and the kicker guide 254 can include a pin to be received by the slot 260. In some embodiments, additionally and/or alternatively to the slot 260, the kicker guide 254 can include a protrusion extending away from the top of the kicker guide 254, at least partially across the distance between one inner arm 130 to the other inner arm 130, to act as stop on the rotation of the kicker 252.

Referring still to FIGS. 10-14, the kicker 252 includes a first end 262 and a second end 264. The kicker 252 is coupled to the third scissor layer proximate the first end 262 (e.g., via the kicker guide 254 and the kicker pivot pin 256) and the kicker 252 is to the fourth scissor layer 105 proximate the second end 264. The second end 264 of the kicker 252 is movably (e.g., slidably) and selectively coupled to the inner arms 131 of the fourth scissor layer 105 by a movable connection (e.g., rollers, a pin and slot connection, reduced-friction surfaces, etc.) shown as roller 266. The roller 266 is coupled to the kicker 252 proximate the second end 264 of the kicker 252. The roller 266 is configured to selectively engage with a plate (e.g., support, surface, member, etc.) shown as kicker plate 268. The kicker plate 268 is coupled to one of the inner arms 131 of the fourth layer. In some embodiments, the kicker plate 268 is integral to one of the inner arms 131. The kicker plate 268 includes an engagement surface, (e.g., contact zone, reduced-friction area, etc.), shown as surface 270, configured to selectively engage with the roller 266. In some embodiments, the surface 270 extends the entire length of the kicker plate 268. In some embodiments, the surface 270 extends only a portion of the length of the kicker plate 268. The length of the engagement surface 270 may depend in part on allowed degrees of rotation for the kicker 252. For example, the length of the engagement surface 270 may be substantially (e.g., +/−10%) equal to the horizontal component of the arc made by the rotation of the second end 264 of the kicker 252.

Figure 12:
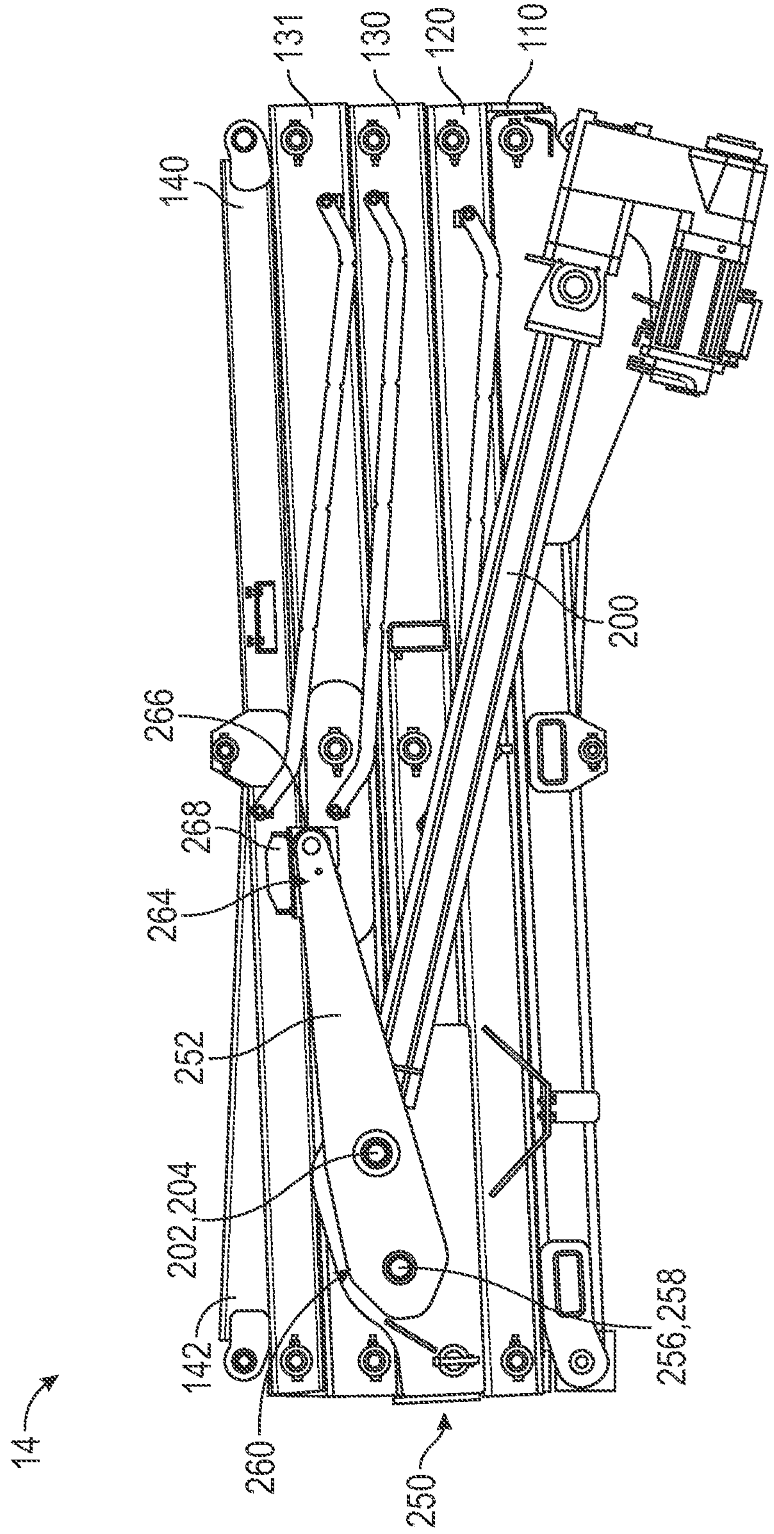
FIG. 12 is a side view of the lift assembly of FIG. 1 in a fully retracted position, according to an exemplary embodiment.
Figure 13:
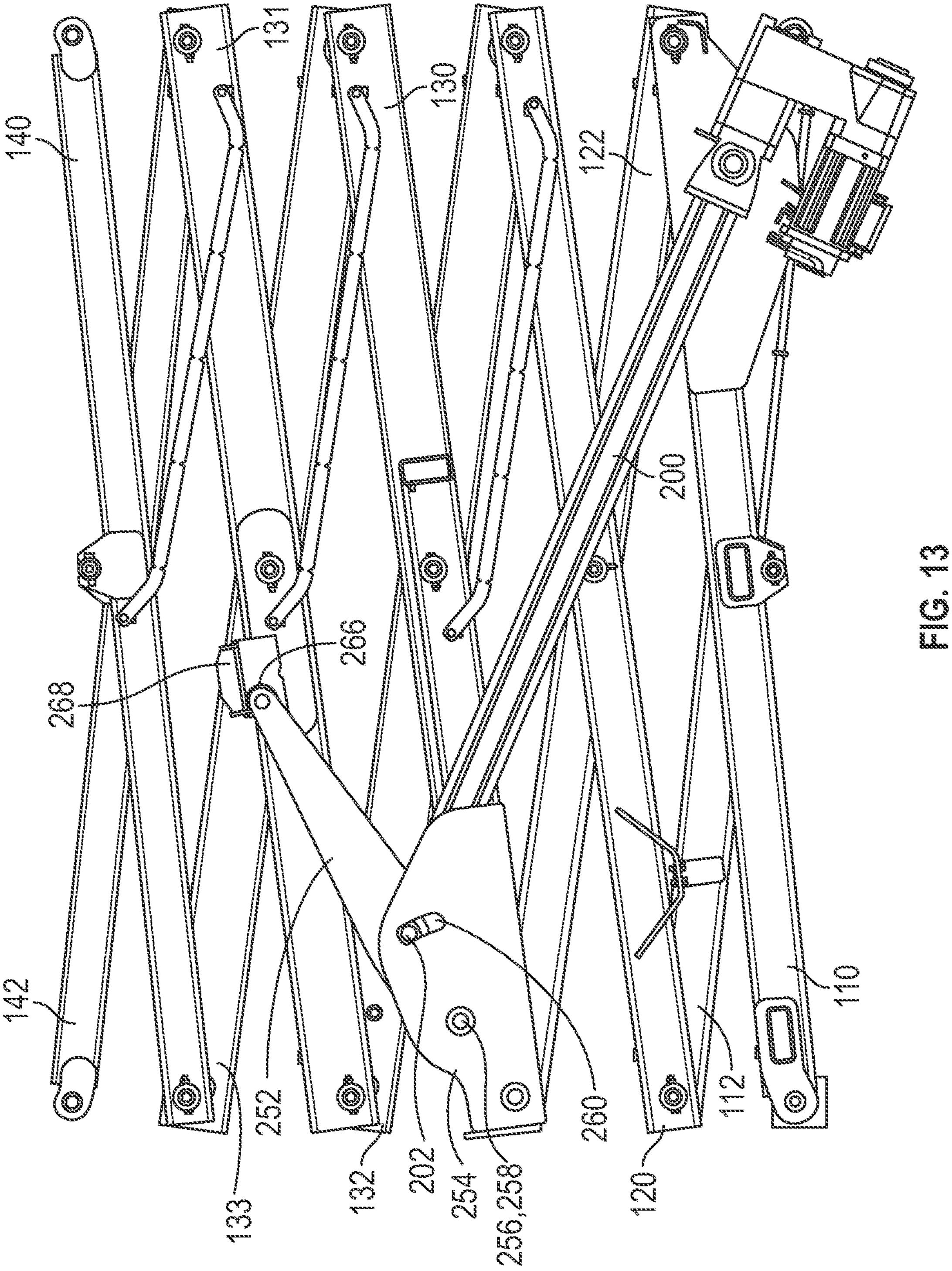
FIG. 13 is a side view of the lift assembly of FIG. 1 in a partially extended position, according to an exemplary embodiment.
Figure 14:
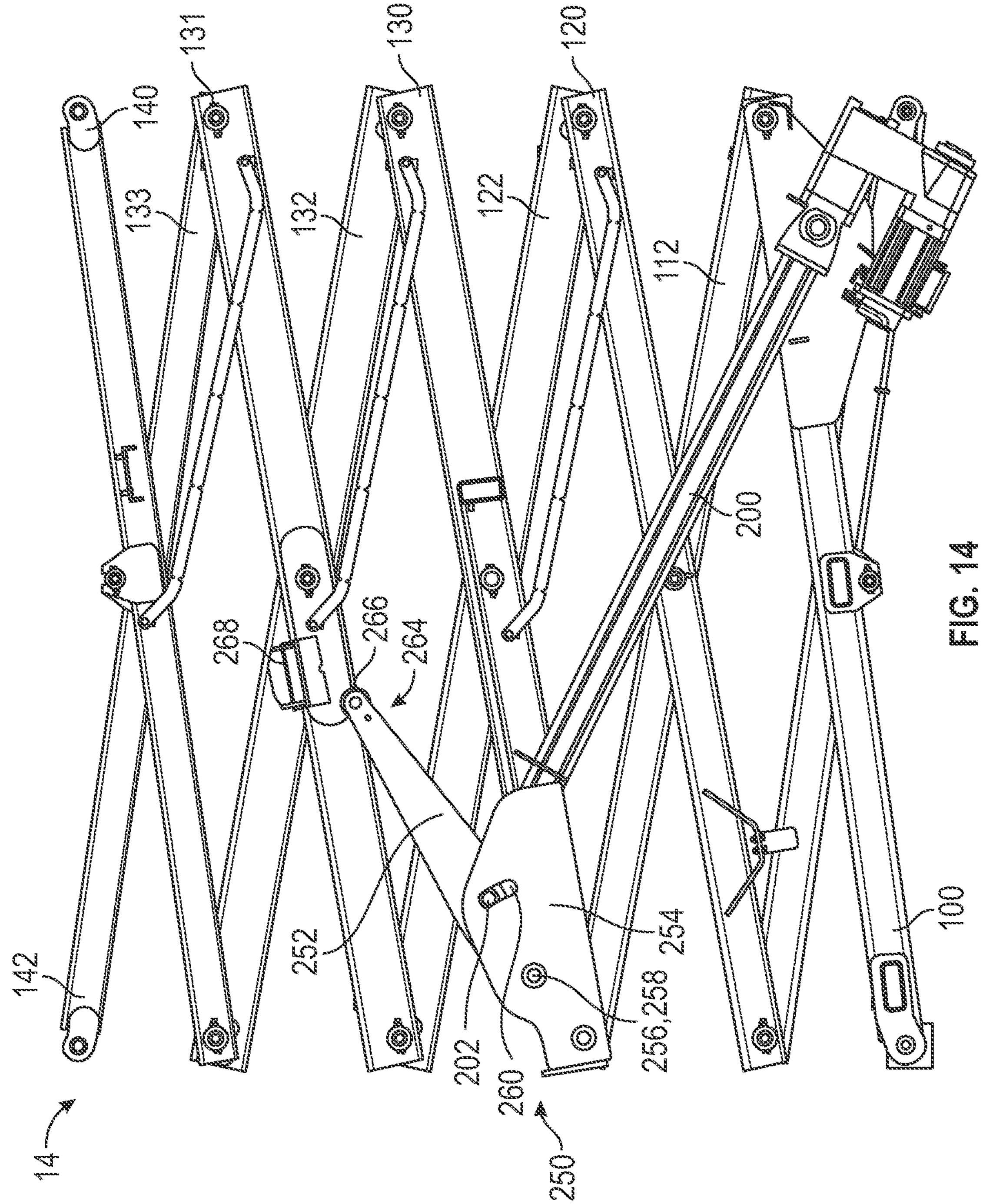
FIG. 14 is a side view of the list assembly of FIG. 1 in a fully extended position, according to an exemplary embodiment.

The kicker assembly 250 extends and retracts the lift assembly 14 in two stages, as shown in FIGS. 12-14. Referring first to FIG. 12, the kicker assembly 250 is shown (with the kicker guide 254 for illustrative purposes) in the first stage. During the first stage the roller 266 of the kicker 252 is selectively engaged with the engagement surface 270 of the kicker plate 268. Referring now to FIG. 13, as the lift actuator 200 extends in the first stage, the actuator pin 202 travels along the slot 260 in the kicker guide 254, causing the kicker 252 to rotate around the kicker axis 258. As the second end 264 of the kicker 252, it engages with the kicker plate 268 and imparts a vertical force on the kicker plate 268, lifting the fourth scissor layer 105. The sliding connection between the roller 266 and the engagement surface 270 of the kicker plate 268 ensures that the horizontal motion of the second end 264 is not transferred to the kicker plate 268. Instead, the roller 266 translates along the length of the kicker plate 268.

During the first stage, the actuator pin 202 travels along the path of the slot 260. At a transition point, the actuator pin 202 reaches the end of the slot 260, such that the force of the lift actuator 200 no longer passes through the second end 264 of the kicker 252 to the kicker plate 268 and the fourth scissor layer 105. Instead, in the second stage of the lifting operation as shown in FIG. 4, the actuator pin 202 is at the end of the slot 260. The actuator pin 202 is then engaged with the kicker guide 254, such that the force generated by the lift actuator 200 passes through the kicker guide and into the third scissor layer 104. The lift assembly 14 thereafter continues to extend. When the lift assembly 14 is retracted the order is reversed. The transition point can be adjusted by adjusting the dimensions of the slot 260.

When using a scissor lift, a purely vertical movement of the platform is desired by the user. This type of movement is typically what a user expects when using a scissor lift, and the user will typically set the scissor lift up in a location according to this assumption. Accordingly, any longitudinal movement of the platform may be considered undesirable by the user. By way of example, the user may place the scissor lift up against a wall of a structure. If the platform were to move longitudinally toward the wall, the platform could contact the wall, causing damage to the wall and/or the lift device.

The lift assembly 14 with the kicker assembly 250 is configured to eliminate any longitudinal movement of the platform 16. The frame assembly 12 is longitudinally fixed to the end axis 160, and the platform 16 is longitudinally fixed to the end axis 180. Accordingly, if the end axis 180 were to move longitudinally relative to the end axis 160, the platform 16 would also move longitudinally the same distance. However, because the middle pin offset distances of the top scissor layer 106 and the bottom scissor layer 100 are equal, the platform 16 moves purely vertically. This arrangement permits the increased strength from offsetting the middle pins without introducing longitudinal movement to the platform 16. In other embodiments, the middle pin offset distances of the top scissor layer 106 and the bottom scissor layer 100 may vary, described in greater detail in U.S. application Ser. No. 16/811,272, filed Mar. 6, 2020, the entire disclosure of which is incorporated by reference herein. Similarly, the roller 266 is movably coupled with the kicker plate 268 such that the roller 266 can travel (e.g., slide, roll, etc.) across the kicker plate 268 and transfer only vertical forces to the fourth scissor layer 105.

Figure 15:
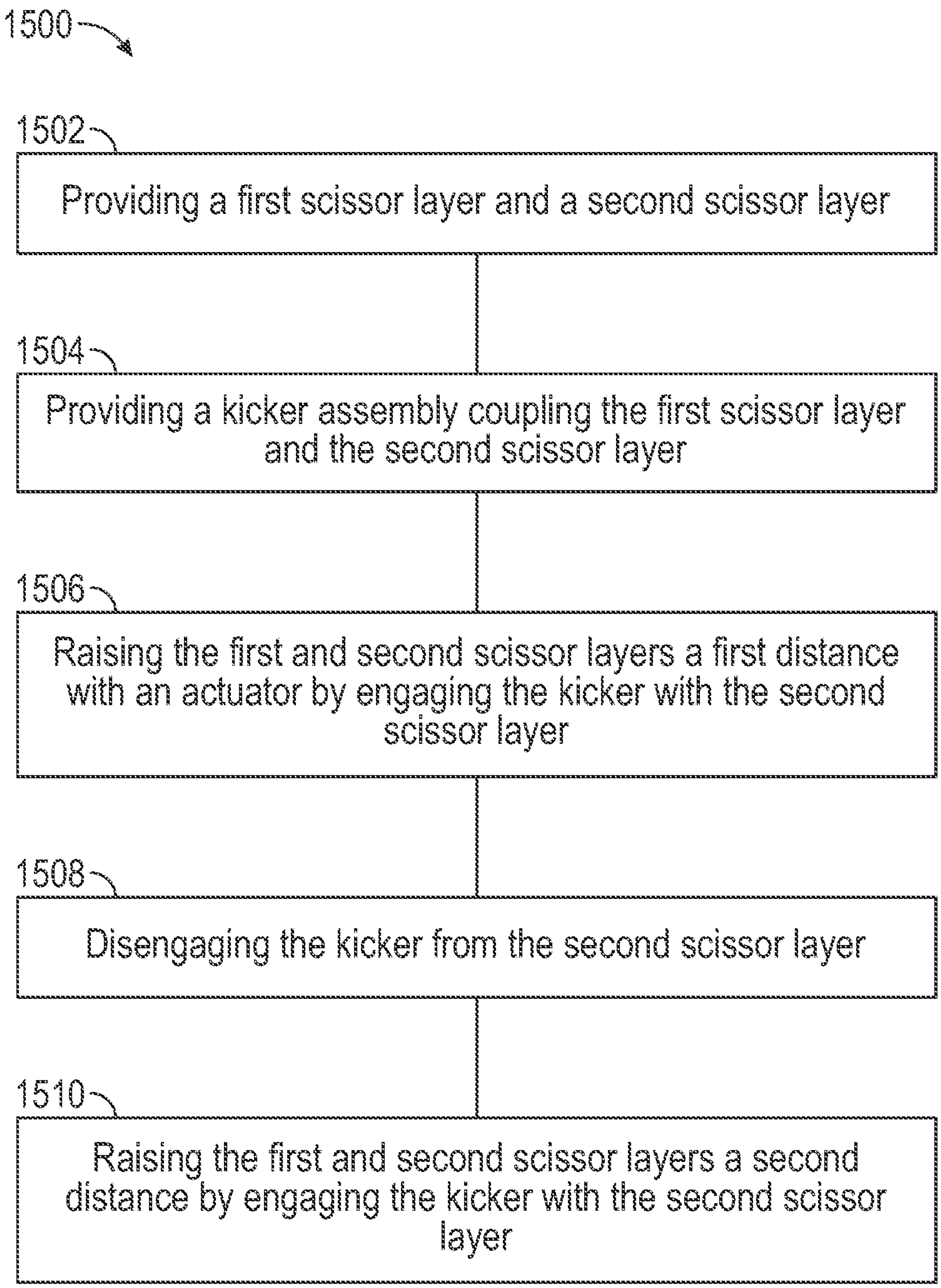
FIG. 15 is a flow diagram of a process for raising and lowering the lift assembly of FIG. 1, according to an exemplary embodiment.

Referring now to FIG. 15, a flow diagram of a process 1500 for extending a lift assembly such as lift assembly 14 includes steps 1502-1510, according to some embodiments. In some embodiments, the process 1500 is performed by the lift assembly 14. In some embodiments, the process facilitates the extension of the lift assembly 14 by providing mechanical advantage to the lift actuator 200 during the initial stages of extending the lift assembly 14 the lift device 10.

The process 1500 includes providing a first scissor layer and a second scissor layer (step 1502). In some embodiments, the first scissor layer and the second scissor are one or more of the series of subassemblies shown as scissor layers of lift assembly 14. For example, the first scissor layer can be the third scissor layer 104 and the second scissor layer can be the fourth scissor layer 105.

The process 1500 includes providing a kicker assembly coupling the first scissor layer and the second scissor layer (step 1504). The kicker assembly may be the same or substantially similar to the kicker assembly 250. The kicker assembly 250 can include a kicker (e.g., kicker 252) pivotally coupled to the first scissor layer and selectively coupled to the second scissor layer. The kicker is pivotally couple to an actuator (e.g., lift actuator 200), such that the actuator causes the kicker to rotate around a pivot point (e.g., kicker axis 258) relative to the first scissor layer. The kicker assembly includes a stop (e.g., kicker guide 254) configured to limit the rotation of the kicker. In some embodiments, the kicker is coupled to the actuator by an actuator pin. The actuator pin can extend through the kicker and into the stop. The stop can include a guide (e.g., slot 260) to receive the actuator pin. The stop limits the rotation of the kicker by limiting the movement of the actuator pin. In some embodiments, the stop includes a bar or protrusion extending at least partially across the first scissor layer, from one member to another, and the arm acts as a stop to limit the rotation of the kicker. As the kicker pivots around the kicker axis, it rotates until it engage with the stop.

The process 1500 includes raising the first and second scissor layers a first distance with an actuator by engaging the kicker with the second scissor layer (step 1506). The kicker assembly can raise the first and second scissor layers by engaging the kicker with the second scissor layer. In some embodiments, the kicker engages with a plate (e.g., the kicker plate 268) coupled to the second scissor layer. As the actuator extends, the kicker rotates around the kicker pivot. An end of the kicker can engage with the plate and impart a vertical force on the plate, raising the second scissor layer and in turn the first scissor layer. The kicker can engage with the plate by a slidable connection (e.g., roller 266), such that all, or substantially all of the horizontal movement of the kicker is not transferred to the plate. As the kicker rotates, the kicker slides along the plate until the kicker reaches the end of the plates. The kicker has in turn raised the first and second scissor layer a first distance. The first distance can be adjusted based by the length of the plate, the allowed rotation of the kicker, and/or the length of the kicker.

The process 1500 includes disengaging the kicker from the second scissor layer (step 1508). The kicker disengages from the second scissor, such that force is no longer transferred through the kicker and into the second scissor layer via the plate. The kicker can be disengaged when the actuator pin reaches the end of the slot and the kicker can no longer rotate. At that stage, the force from the actuator is transferred to the lift assembly via the stop.

The process 1500 includes raising the first and second scissor layers a second distance by engaging the kicker with the first scissor layer (step 1510). When the actuator pin reaches the end of the slot, the actuator pin engages with stop coupled with the first scissor layer such that the force of the actuator now passes through the stop to the first scissor layer. The actuator then continues to extend and raise the first scissor layer and the second scissor layer a second distance. The second distance can depend on the stroke length of the actuator, the desired height of the lift assembly, etc.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A lift device, comprising:
- a base;
- a platform; and
- a scissor assembly coupling the base to the platform, comprising:
  - a plurality of scissor layers, each of the plurality of scissor layers coupled to at least one other of the plurality of scissor layers and comprising an inner arm coupled to an outer arm;

an actuator configured to move the platform between a fully raised position and a fully lowered position relative to the base; and a kicker assembly coupling the actuator to the at least one of the plurality of scissor layers, the kicker assembly comprising:

a kicker having opposing first and second kicker ends, the kicker pivotally coupled to the at least one of the plurality of scissor layers proximate the first kicker end and releasably coupled to at least one other of the plurality of scissor layers proximate the second kicker end, wherein the kicker is operably coupled to the actuator between the first and second kicker ends such that the actuator is configured to rotate the kicker relative to the at least one of the plurality of scissor layers about a kicker axis; and a guide coupled to the kicker and configured to limit the rotation of the kicker, wherein the kicker is pivotally coupled to the actuator by an actuator pin, the actuator pin at least partially extending into a slot in the guide.

2. The lift device of claim 1, wherein a length of the slot limits the rotation of the kicker about the kicker axis, such that in operation as the actuator extends the actuator pin moves along the slot from a first slot end to a second slot end.

3. The lift device of claim 1, wherein the slot follows an arc of a circle centered at the kicker axis.

4. The lift device of claim 1, further comprising a kicker plate coupled to the at least one other of the plurality of scissor layers, and wherein the kicker is releasably coupled to the at least one other of the plurality of scissor layers via the kicker plate and is supported for sliding movement along the kicker plate.

5. The lift device of claim 4, wherein, in a first stage, the kicker is movably engaged with the at least one other of the plurality of scissor layers, such that a force from the actuator to the at least one other of the plurality of scissor layers partially passes directly from the second end of the kicker to the at least one other of the plurality of scissor layers.

6. The lift device of claim 5, wherein, in a second stage, the kicker is disengaged from the at least one other of the plurality of scissor layers such that the force from the actuator to the at least one other of the plurality of scissor layers partially passes through the guide and the at least one of the plurality of scissor layers.

7. The lift device of claim 6, wherein the scissor assembly transitions from the first stage to the second stage based on at least one an angle of the kicker relative to the guide or a length of an engagement surface of the kicker plate releasably coupling the second kicker end to the at least one other of the plurality of scissor layers.

8. The lift device of claim 1, the plurality of scissor layers further comprising:

a first scissor layer including a first inner arm pivotally coupled to a first outer arm, wherein the first inner arm is configured to rotate relative to the first outer arm about a first middle axis, wherein the first scissor layer has a first end axis center point positioned at an intersection of (a) a first straight line that extends from an upper end of the first inner arm to a lower end of the first inner arm and (b) a second straight line that extends from an upper end of the first outer arm to a lower end of the first outer arm, the first end axis center point vertically offset from the first middle axis.

9. The lift device of claim 1, further comprising:

a first mode of operation defined when the kicker rotates around the kicker axis and the second kicker end is movably coupled to the at least one of the plurality of scissor layers; and a second mode of operation defined when the kicker is static relative to the guide and the second kicker end is removed from the at least one of the plurality of scissor layers.

10. A scissor assembly, comprising:

a plurality of scissor layers and an actuator configured to extend and retract the scissor layers, wherein each scissor layer includes:

an inner arm; and an outer arm pivotally coupled to the inner arm such that the outer arm and the inner arm rotate relative to one another;

a kicker assembly selectively coupling the actuator to a first scissor layer of the plurality of scissor layers and a second scissor layer of the plurality of scissor layers, the kicker assembly comprising:

a kicker pivotally coupled to the first scissor layer and rotatable around a kicker axis relative to the first scissor layer and the second scissor layer; and a stop supported by the first scissor layer and configured to selectively restrain the rotation of the kicker around the kicker axis to an arc centered at the kicker axis;

wherein the kicker is operably coupled to the actuator by a pin, such that the actuator is configured to rotate the kicker around the kicker axis, wherein the pin extends through the kicker and selectively engages with the stop to limit rotation of the kicker.

11. The scissor assembly of claim 10, wherein the outer arm of each scissor layer rotate relative to one another about a middle axis, and wherein the middle axis of at least one of the scissor layers is offset from a longitudinal axis of at least one of the inner arm or the outer arm of each of the scissor layers.

12. The scissor assembly of claim 10, wherein at least one of the plurality of scissor layers includes a middle axis offset vertically from an axis center point positioned at an intersection of an inner arm of the at least one of the plurality of scissor layers and an outer arm of the at least one of the plurality of scissor layers.

13. The scissor assembly of claim 10, wherein the kicker is pivotally coupled to the actuator by the pin, such that the pin at least partially extends beyond the kicker.

14. The scissor assembly of claim 13, wherein the stop includes a slot configured to receive the pin having a first and second slot ends for movement of the pin from the first slot end to the second slot end.

15. The scissor assembly of claim 10, wherein, in a first stage, the kicker is rotatable around the kicker axis, and in a second stage, the stop restrains the kicker from rotating around the kicker axis.

16. The scissor assembly of claim 15, wherein the kicker transitions from the first stage to the second stage based on at least one of a length of the arc or a length of an engagement surface of the kicker.

* * * * *